United States Patent
Shinkai

(10) Patent No.: US 9,583,102 B2
(45) Date of Patent: Feb. 28, 2017

(54) METHOD OF CONTROLLING INTERACTIVE SYSTEM, METHOD OF CONTROLLING SERVER, SERVER, AND INTERACTIVE DEVICE

(71) Applicant: Sharp Kabushiki Kaisha, Osaka-shi, Osaka (JP)

(72) Inventor: Makoto Shinkai, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 14/601,949

(22) Filed: Jan. 21, 2015

(65) Prior Publication Data

US 2015/0206534 A1 Jul. 23, 2015

(30) Foreign Application Priority Data

Jan. 22, 2014 (JP) .................................. 2014-009562

(51) Int. Cl.

| G10L 15/00 | (2013.01) |
|---|---|
| G10L 15/22 | (2006.01) |
| G10L 17/26 | (2013.01) |

(52) U.S. Cl.
CPC ............ *G10L 15/22* (2013.01); *G10L 17/26* (2013.01); *G10L 2015/227* (2013.01)

(58) Field of Classification Search
USPC .................................. 704/231–257, 270–275
See application file for complete search history.

(56) References Cited

U.S. PATENT DOCUMENTS

| 6,445,978 B1* | 9/2002 | Takamura ............... A63H 11/00 700/17 |
|---|---|---|
| 6,452,348 B1* | 9/2002 | Toyoda ................... G10L 15/26 318/3 |
| 6,512,965 B2* | 1/2003 | Osawa ..................... A63H 3/28 318/565 |
| 6,757,362 B1* | 6/2004 | Cooper ................. H04M 3/527 379/88.01 |
| 7,222,076 B2* | 5/2007 | Kobayashi .............. G10L 13/00 704/275 |
| 2002/0198717 A1* | 12/2002 | Oudeyer ................. G10L 13/00 704/270 |

FOREIGN PATENT DOCUMENTS

| JP | 10-328421 A | 12/1998 |
|---|---|---|
| JP | 2001-157976 A | 6/2001 |
| JP | 2002-205289 A | 7/2002 |
| JP | 2006-209215 A | 8/2006 |
| JP | 2008-158697 A | 7/2008 |

* cited by examiner

*Primary Examiner* — Jesse Pullias
(74) *Attorney, Agent, or Firm* — Birch, Stewart, Kolasch & Birch, LLP

(57) ABSTRACT

A method of controlling an interactive system includes the steps of: referring to a storage portion storing a plurality of response information about a manner of operation responsive to a user, each associated with a priority serving as an index when being selected; selecting one response information in accordance with the priorities of the plurality of response information; executing response processing for the user based on the selected response information; accepting voice input for the response processing from the user; evaluating the user's reaction to the response processing based on a manner of voice of the accepted voice input; and changing the priority of the selected response information stored in the storage portion based on an evaluation result.

3 Claims, 15 Drawing Sheets

FIG.3

RESPONSE CONTENT DATABASE 232

| RESPONSE ID | RECOGNITION PHRASE | PRIORITY | ANSWER PHRASE |
|---|---|---|---|
| 1 | GOOD MORNING | 20 | GOOD MORNING! GOOD LUCK TODAY! |
| 2 | GOOD MORNING | -10 | GOOD MORNING |
| 3 | GOOD MORNING | 0 | YAWN. I'M STILL SLEEPY. |
| 4 | I'M BACK | 30 | WELCOME BACK. DID YOU HAVE HARD DAY? |
| 5 | I'M BACK | 10 | WELCOME BACK |
| ... | ... | ... | ... |
| 100 | null | ... | WHAT DID YOU SAY? |
| 101 | null | ... | SAY ONCE AGAIN |

FIG.4

RESPONSE HISTORY STORAGE PORTION 233

(a)

| DEVICE ID | TIME | RESPONSE ID | TARGET OF EVALUATION |
|---|---|---|---|
| ... | ... | ... | ... |
| 10 | 2013-09-12 06:30:42 | 1 | YES |
| 11 | 2013-09-12 06:30:45 | 100 | NO |

VOICE DATA STORAGE PORTION 234

(b)

| DEVICE ID | TIME | VOICE DATA ID |
|---|---|---|
| ... | ... | ... |
| 10 | 2013-09-12 06:31:00 | 100 |
| 11 | 2013-09-12 06:31:10 | 101 |

FIG.5

DEVICE ATTRIBUTE DATABASE 231

| DEVICE ID | SOUND VOLUME | RATE OF SPEECH | REPLY TIME |
|---|---|---|---|
| 10 | −35.3dB | 80 WORDS/MINUTE | 8300msec |
| 11 | −31.9dB | 100 WORDS/MINUTE | 5500msec |
| ... | ... | ... | ... |

| EVALUATION VALUE X | PRIORITY |
|---|---|
| 1.5<X | +30 |
| 1.3<X≤1.5 | +20 |
| 1.1<X≤1.3 | +10 |
| 0.9≤X≤1.1 | 0 |
| 0.8≤X<0.9 | -10 |
| 0.7≤X<0.8 | -20 |
| X<0.7 | -30 |

(B)

| EVALUATION VALUE Y | PRIORITY |
|---|---|
| 1.5<Y | -30 |
| 1.3<Y≤1.5 | -20 |
| 1.1<Y≤1.3 | -10 |
| 0.9≤Y≤1.1 | 0 |
| 0.8≤Y<0.9 | +10 |
| 0.7≤Y<0.8 | +20 |
| Y<0.7 | +30 |

(C)

| RECOGNITION PHRASE | PRIORITY |
|---|---|
| THANK YOU | +30 |
| GREAT | +20 |
| TERRIFIC | +20 |
| BORING | -20 |
| NO THANK YOU | -20 |
| SHUT UP | -10 |

| REFERENCE VALUE | | |
|---|---|---|
| SOUND VOLUME | RATE OF SPEECH | REPLY TIME |
| −35.3 | 80 | 8300 |

(B)

| ACQUIRED VALUE | | |
|---|---|---|
| SOUND VOLUME | RATE OF SPEECH | REPLY TIME |
| −31 | 90 | 9500 |

(C)

| SOUND VOLUME | RATE OF SPEECH | REPLY TIME |
|---|---|---|
| EVALUATION VALUE | EVALUATION VALUE | EVALUATION VALUE |
| 0.878 | 1.125 | 1.145 |
| +10 | +10 | −10 |

FIG.11

RESPONSE CONTENT DATABASE 232A (A)

| RESPONSE ID | RECOGNITION PHRASE | PRIORITY | RESPONSE MODE |
|---|---|---|---|
| 1 | GOOD MORNING | 20 | OPERATION PATTERN 1 |
| 2 | GOOD MORNING | -10 | OPERATION PATTERN 2 |
| 3 | GOOD MORNING | 0 | OPERATION PATTERN 3 |
| ⋮ | ⋮ | ⋮ | ⋮ |

RESPONSE CONTENT DATABASE 232B (B)

| RESPONSE ID | RECOGNITION PHRASE | PRIORITY | RESPONSE MODE |
|---|---|---|---|
| 1 | GOOD MORNING | 20 | DISPLAY PATTERN 1 |
| 2 | GOOD MORNING | -10 | DISPLAY PATTERN 2 |
| 3 | GOOD MORNING | 0 | DISPLAY PATTERN 3 |
| ⋮ | ⋮ | ⋮ | ⋮ |

| USER ID | NAME | GENDER | AGE BRACKET | RESPONSE CONTENT DATABASE |
|---|---|---|---|---|
| 001A | YOSHIKO | FEMALE | 10'S | DB1 |
| 002A | HANAKO | FEMALE | 20'S | DB2 |
| 003A | KEIKO | FEMALE | 30'S – 50'S | DB3 |
| 004A | TOMOZO | MALE | 60'S | DB4 |

FIG.14

RESPONSE CONTENT DATABASE 232#

| RESPONSE ID | RECOGNITION PHRASE | PRIORITY | RESPONSE MODE |
|---|---|---|---|
| 1 | HOW'S THE WEATHER? | 20 | TURN ON TV (ch1) |
| 2 | HOW'S THE WEATHER? | −10 | TURN ON TV (ch2) |
| 3 | HOW'S THE WEATHER? | 0 | ACCESS WEATHER SITE (URL) |
| ⋮ | ⋮ | ⋮ | ⋮ |

METHOD OF CONTROLLING INTERACTIVE SYSTEM, METHOD OF CONTROLLING SERVER, SERVER, AND INTERACTIVE DEVICE

This nonprovisional application is based on Japanese Patent Application No. 2014-009562 filed on Jan. 22, 2014 with the Japan Patent Office, the entire contents of which are hereby incorporated by reference.

BACKGROUND OF THE INVENTION

Field of the Invention

The present disclosure relates to a method of controlling an interactive system, a method of controlling a server, a server, and an interactive device for providing pseudo communication.

Description of the Background Art

A robot device capable of communicating with a user is proposed as an interactive device (Japanese Patent Laying-Open No. 2002-205289).

This device has a learning function. The device detects the user's operation such as petting the robot device and learns the action praised by the user to change a response content so as to meet the user's preference.

SUMMARY OF THE INVENTION

The robot device above learns the user's preference and the like through the action such as petting by the user but cannot appropriately determine the user's preference from the user's voice and cannot achieve smooth communication.

The present disclosure is made in order to solve the problem above. An object of the present disclosure according to an aspect is to provide a method of controlling an interactive system, a method of controlling a server, a server, and an interactive device to enable smooth communication.

According to an aspect of the present disclosure, a method of controlling an interactive system is provided. The method of controlling an interactive system includes the steps of: referring to a storage portion storing a plurality of response information about a manner of operation responsive to a user, each associated with a priority serving as an index when being selected, and selecting one response information in accordance with the priorities of the plurality of response information; executing response processing for the user based on the selected response information; accepting voice input for the response processing from the user; evaluating the user's reaction to the response processing based on a manner of voice of the accepted voice input; and changing the priority of the selected response information stored in the storage portion based on an evaluation result.

According to another aspect of the present disclosure, a method of controlling a server provided to be able to communicate with an interactive device is provided. The method of controlling a server includes the steps of: referring to a storage portion storing a plurality of response information about operation of the interactive device responsive to a user, each associated with a priority serving as an index when being selected, and selecting one response information in accordance with the priorities of the plurality of response information stored in the storage portion; instructing the interactive device to execute response processing based on the selected response information; receiving voice input for the response processing from the user; evaluating the user's reaction to the response processing based on a manner of voice of the accepted voice input; and changing the priority of the selected response information stored in the storage portion based on an evaluation result.

Preferably, the step of evaluating includes the step of evaluating the user's reaction to the response processing based on at least one of a reply time to the response processing, sound volume, and rate of speech as a manner of voice of the voice input accepted by the voice input reception portion.

Preferably, the step of changing includes the step of increasing the priority when it is determined that the reaction is good as an evaluation result, and decreasing the priority when it is determined that the reaction is bad.

Preferably, the method of controlling a server further includes the step of instructing the interactive device to execute response processing for prompting a re-response from the user when voice input is not accepted from the user as a reply to the response processing.

Preferably, the method of controlling a server further includes the steps of: carrying out voice recognition of the received voice input; and instructing the interactive device to execute response processing for prompting a re-response from the user when voice recognition is failed in the step of carrying out voice recognition.

According to a further aspect of the present disclosure, a server provided to be able to communicate with an interactive device is provided. The server includes a storage portion storing a plurality of response information about operation of the interactive device responsive to a user, each associated with a priority serving as an index when being selected, a selection portion for selecting one response information in accordance with the priorities of the plurality of response information stored in the storage portion, a response processing execution instruction portion for instructing the interactive device to execute response processing based on the response information selected by the selection portion, a voice input reception portion for receiving voice input for the response processing from the user, an evaluation portion for evaluating the user's reaction to the response processing based on a manner of voice of the voice input accepted by the voice input reception portion, and a change portion for changing the priority of the selected response information stored in the storage portion based on an evaluation result from the evaluation portion.

Preferably, the evaluation portion evaluates the user's reaction to the response processing based on at least one of a reply time to the response processing, sound volume, and rate of speech as a manner of voice of the voice input accepted by the voice input reception portion.

Preferably, the change portion increases the priority when it is determined that the reaction is good as an evaluation result from the evaluation portion, and decreases the priority when it is determined that the reaction is bad.

Preferably, the response processing execution instruction portion gives an instruction to execute response processing for prompting a re-response from the user when voice input is not accepted by the voice input reception portion as a reply to the response processing from the user.

Preferably, the server further includes a voice recognition portion for carrying out voice recognition of voice input. The response processing execution instruction portion gives an instruction to execute response processing for prompting a re-response from the user when voice recognition by the voice recognition portion is failed.

According to yet another aspect of the present disclosure, an interactive device provided to be able to communicate with a server is provided. The interactive device includes a response processing execution portion. The server refers to a storage portion storing a plurality of response information about operation of the interactive device responsive to a user, each associated with a priority serving as an index when being selected, and the response processing execution portion executes response processing based on one response information selected in accordance with the priorities of the plurality of response information. The interactive device also includes a voice input acceptance portion for accepting voice input for the response processing from the user, and a voice output portion for outputting information about the voice input accepted by the voice input acceptance portion to the server.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating a response content database 232 based on the present first embodiment.

FIG. 4 is a diagram illustrating a response history storage portion 233 and a voice data storage portion 234 based on the present first embodiment.

FIG. 5 is a diagram illustrating a device attribute database 231 based on the present first embodiment.

FIG. 9 is a table illustrating the correspondence between evaluation value and priority based on the present first embodiment.

FIG. 10 is a diagram illustrating changing the priority based on the present first embodiment.

FIG. 11 is a diagram illustrating a response content database based on the present second embodiment.

FIG. 12 is a diagram illustrating a user table 235 based on the present third embodiment.

FIG. 14 is a diagram illustrating a response content database based on the present fourth embodiment.

DESCRIPTION OF THE PREFERRED EMBODIMENTS

Figure 1:
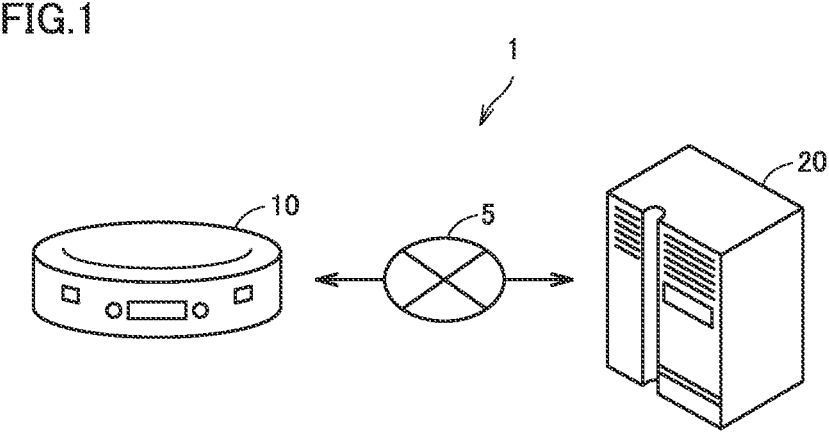
FIG. 1 is a diagram illustrating an interactive system 1 based on the present embodiment.

The present embodiment will be described hereinafter with reference to the drawings. When the number and a quantity are mentioned in the description of the embodiment, the scope of the present disclosure is not necessarily limited to the number and the quantity, unless otherwise specified. In the description of the embodiment, the same or corresponding elements have the same reference characters allotted and redundant description may not be repeated. Combination for use of features shown in a configuration shown in the embodiment as appropriate is originally intended, unless otherwise restricted.

<First Embodiment>

(Configuration of Interactive System 1)

FIG. 1 is a diagram illustrating an interactive system 1 based on the present embodiment.

Referring to FIG. 1, interactive system 1 based on the present embodiment is configured with a cleaning robot (interactive device) 10, a network 5, and a server 20.

Cleaning robot 10 is provided to be able to communicate with server 20 through network 5. Though communication with server 20 through network 5 is described in the present example, cleaning robot 10 may directly communicate with server 20.

In voice recognition system 1, when cleaning robot 10 outputs voice to a person (user) and accepts input of voice uttered by the person (user) in response, server 20 carries out voice recognition, and cleaning robot 10 outputs voice representing a content of response to the input voice (hereinafter also denoted as "voice response"), by way of example. By repeating this processing, interactive system 1 according to the present embodiment realizes pseudo conversation between the user and cleaning robot 10.

Although cleaning robot 10 recognizing voice and outputting a voice response to the user is described by way of example of the interactive device in the present embodiment, the present disclosure is not limited thereto. For example, a doll having an interactive function or a home electrical appliance other than cleaning robot 10 (such as a television or a microwave oven) can also be adopted as an interactive device.

Although a configuration in which server 20 is implemented by a single server is described by way of example in the present embodiment, the present disclosure is not limited thereto and a configuration in which at least some of portions (functions) of server 20 may be implemented by other servers may be adopted.

(Configuration of Main Portion of Interactive System 1)

Figure 2:
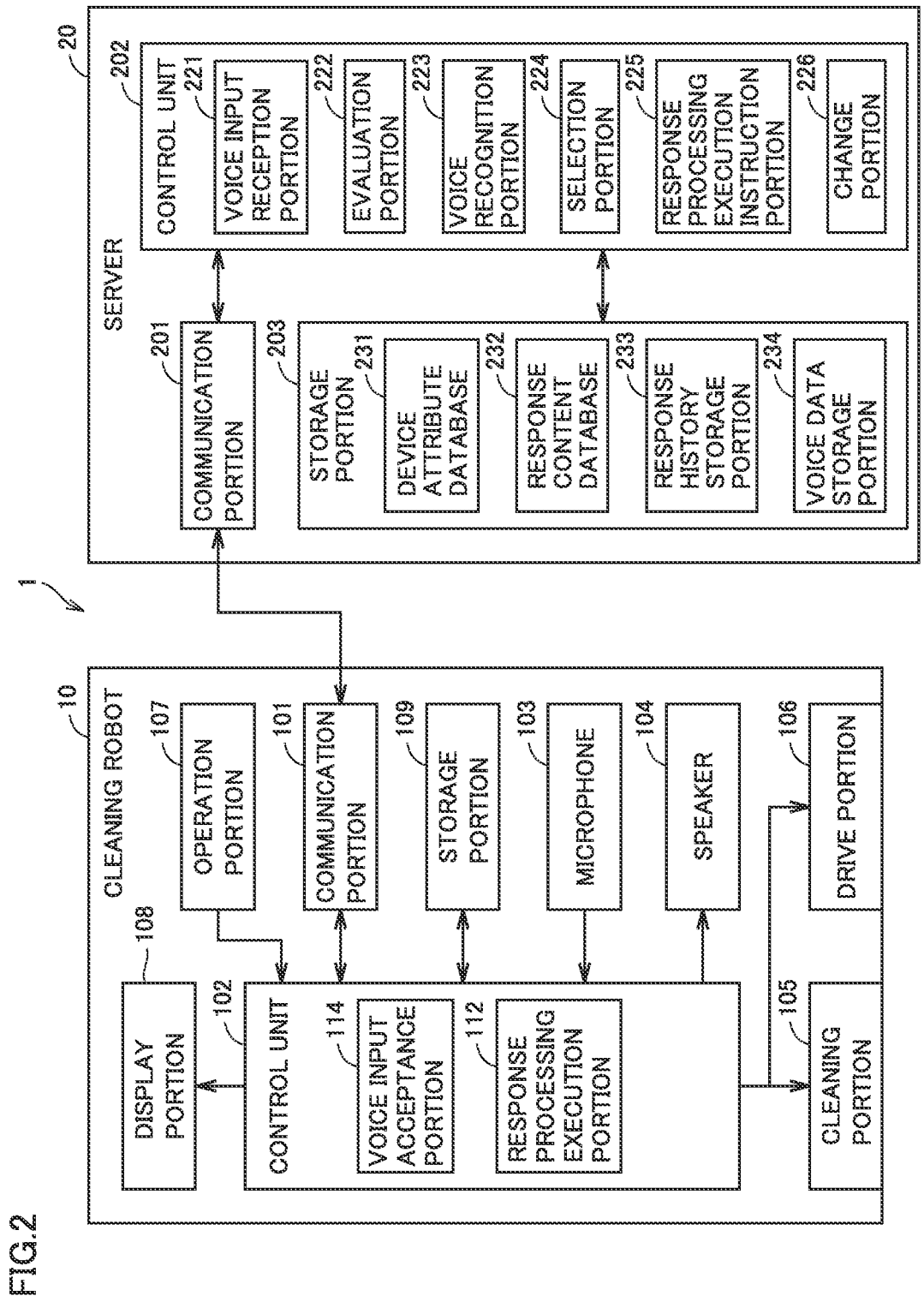
FIG. 2 is a diagram illustrating a configuration of a main portion of interactive system 1 according to the present embodiment.

FIG. 2 is a diagram illustrating a configuration of a main portion of interactive system 1 according to the present embodiment.

A configuration of cleaning robot 10 will initially be described with reference to FIG. 2.

Cleaning robot 10 based on the present embodiment includes a communication portion 101, a control unit 102, a microphone 103, a speaker 104, a cleaning portion 105, a drive portion 106, a display portion 108, and a storage portion 109.

Communication portion 101 carries out communication with the outside. Specifically, communication portion 101 communicates with server 20 through network 5 such as the Internet. Any of wireless and wired communication is applicable.

Microphone 103 accepts input of sound from the outside. Though microphone 103 accepts input of data of sound included in a frequency band of voice mainly uttered by a person (also referred to as voice data) in the present embodiment, data of sound including a frequency band other than the frequency band of the voice data may be included in sound data representing sound of which input is accepted by microphone 103. Microphone 103 outputs voice data representing input sound to control unit 102.

Speaker 104 outputs voice response representing a response content output from control unit 102. Output of voice response provided by cleaning robot 10 through speaker 104 is hereinafter also denoted as "utterance". Details of the response content will be described later.

Cleaning portion 105 realizes a function as a cleaner based on an instruction from control unit 102.

Drive portion 106 moves cleaning robot 10 based on an instruction from control unit 102.

As cleaning portion 105 and drive portion 106 operate in cooperation, cleaning robot 10 can automatically clean rooms.

Operation portion 107 accepts an instruction to execute a variety of operations for cleaning robot 10.

Display portion 108 realizes various display functions in accordance with an instruction from control unit 102.

Storage portion 109 is a storage device such as a random access memory (RAM) and a flash memory, and stores a program for realizing various functions of cleaning robot 10.

Control unit 102 is mainly configured with a central processing unit (CPU) and realizes a function of each portion as the CPU executes a program stored in storage portion 109.

Control unit 102 controls each portion of cleaning robot 10 in a centralized manner. Specifically, control unit 102 controls a cleaning operation by cleaning robot 10 by controlling cleaning portion 105 and drive portion 106. Control unit 102 transmits voice data representing sound externally obtained by microphone 103 to server 20 through communication portion 101.

Control unit 102 receives answer phrase data obtained by server 20 carrying out voice recognition of voice data transmitted to server 20, through communication portion 101. Then, control unit 102 can output voice response representing a response content from speaker 104 in accordance with the received answer phrase data.

A main functional configuration of control unit 102 will be described.

Control unit 102 includes a response processing execution portion 112 and a voice input acceptance portion 114.

Voice input acceptance portion 114 detects (extracts) voice data. In other words, voice input acceptance portion 114 detects voice data by extracting a frequency band of voice uttered by a person from externally received sound data.

A method of detecting voice data from sound data by voice input acceptance portion 114 can be exemplified by a method of detecting voice data by extracting a frequency band of voice uttered by a person (for example, a frequency band not lower than 100 Hz and not higher than 1 kHz) from sound data. In this case, voice input acceptance portion 114 desirably includes, for example, a band-pass filter or a combination filter of a high-pass filter and a low-pass filter in order to extract a frequency band of voice uttered by a person from sound data.

Voice input acceptance portion 114 outputs the voice data detected from the sound data to server 20 through communication portion 101.

Response processing execution portion 112 utters to the user through speaker 104 by way of example, based on answer phrase data from server 20.

A configuration of server 20 based on the present embodiment will now be described.

Server 20 based on the present embodiment includes a communication portion 201, a control unit 202, and a storage portion 203.

Communication portion 201 carries out communication with the outside. Specifically, communication portion 201 communicates with cleaning robot 10 through network 5 such as the Internet. Any of wireless and wired communication is applicable.

Storage portion 203 is a storage device such as a random access memory (RAM) and a flash memory and stores a program for implementing the functions of server 20. Storage portion 203 has a device attribute database 231 storing attributes (properties) of cleaning robot 10, a response content database 232 that is information about responses to voice input (also referred to as response information), a response history storage portion 233 managing response history, and a voice data storage portion 234 storing voice data, by way of example.

Control unit 202 is mainly configured with a central processing unit (CPU) and realized as the CPU executes a program stored in storage portion 203.

Control unit 202 controls each portion of server 20 in a centralized manner. Specifically, control unit 202 outputs answer phrase data to cleaning robot 10 through communication portion 201, as a result of voice recognition of voice data received from cleaning robot 10 through communication portion 201.

A main functional configuration of control unit 202 of server 20 will now be described.

Control unit 202 includes a voice input reception portion 221, an evaluation portion 222, a voice recognition portion 223, a selection portion 224, a response processing execution instruction portion 225, and a change portion 226.

Voice input reception portion 221 receives voice data transmitted from cleaning robot 10 through communication portion 201. Voice input reception portion 221 outputs the received voice data to voice recognition portion 223 and stores the received voice data into voice data storage portion 234. Voice data storage portion 234 will be described later.

Evaluation portion 222 evaluates the user's reaction based on the manner of voice of voice data stored in voice data storage portion 234. In the present embodiment, a reaction to the content of utterance (voice response) by cleaning robot 10 to the user is evaluated, by way of example.

Change portion 226 changes the priority of selecting response information corresponding to the content of utterance to the user, based on the evaluation result from evaluation portion 222. That is, the priority is increased if the evaluation of the user is high, and the priority is decreased if the evaluation of the user is low.

Voice recognition portion 223 recognizes a content of voice (voice content) represented by the voice data received by voice input reception portion 221 as a recognition content. Specifically, voice recognition portion 223 acquires a recognition phrase for voice data using a dictionary preset in storage portion 203 for use in voice recognition. Voice recognition portion 223 determines that voice recognition is failed if it fails to acquire a recognition phrase for voice data using the dictionary for use in voice recognition. Although voice recognition portion 223 recognizes a voice content represented by voice data received by voice input reception portion 221 in the present example, a voice content may be recognized using voice data stored in voice data storage portion 234.

Selection portion 224 determines a response content based on the recognition result of a voice content by voice recognition portion 223. Specifically, selection portion 224 selects (determines) a response content (response information) corresponding to the voice content represented by voice data by referring to response content database 232 stored in storage portion 203. The details of response content database 232 stored in storage portion 203 will be described later.

Response processing execution instruction portion 225 transmits answer phrase data that is the response content (response information) selected by selection portion 224, to cleaning robot 10 through communication portion 201.

(Response Content Database)

FIG. 3 is a diagram illustrating response content database 232 based on the present first embodiment.

Referring to FIG. 3, response content database 232 is stored in storage portion 203 of server 20 based on the present embodiment, by way of example.

Specifically, a plurality of response information are registered in response content database 232. Specifically, a recognition content (recognition phrase) and a response content (answer phrase) are registered in association with each other. In the present example, an identification number (response ID) is allocated to each combination of a recognition phrase and an answer phrase. The recognition phrases registered in response content database 232 in the present example are registered in the dictionary for use in voice recognition as well.

For example, here, respective answer phrases are stored in association with recognition phrases "Good Morning", "I'm back", . . .

For example, FIG. 3 shows an example in which an answer phrase "Good Morning! Good luck today!" is registered in association with a recognition phrase "Good Morning" for a response ID "1".

FIG. 3 also shows an example in which an answer phrase "Good Morning" is registered in association with a recognition phrase "Good Morning" for a response ID "2".

FIG. 3 also shows an example in which an answer phrase "Yawn. I'm still sleepy" is registered in association with a recognition phrase "Good Morning" for a response ID "3".

FIG. 3 also shows an example in which an answer phrase "Welcome back. Did you have a hard day?" is registered in association with a recognition phrase "I'm back" for a response ID "4".

FIG. 3 also shows an example in which an answer phrase "Welcome back" is registered in association with a recognition phrase "I'm back" for a response ID "5".

In the present example, a priority is related with an answer phrase corresponding to each recognition phrase.

The priority is used as an index for determining the level of being selected in a case where a plurality of answer phrases are provided for the same recognition phrase. That is, the answer phrase corresponding to the identification number ID with a high priority is selected.

The one with a high priority may not necessarily be selected, but the probability of being selected may be increased relatively. This can achieve smooth communication with the user while avoiding patterned answer contents.

In addition, an answer phrase (re-response answer phrase) is provided, which requests a re-response in a case where no recognition phrase is found (null). Here, no recognition phrase found means that voice recognition is failed. When a recognition phrase registered in the dictionary for use in voice recognition is not registered in response content database 232, that is, when voice recognition is successful but no corresponding recognition phrase is registered in response content database 232, the process may proceed assuming that no recognition phrase is found.

Specifically, in FIG. 3, an answer phrase "What did you say?" is registered in association with the case where no recognition phrase is found (null) for a response ID "100".

In FIG. 3, an answer phrase "Say once again" is registered in association with the case where no recognition phrase is found (null) for a response ID "101". Patterned responses can be avoided by providing a plurality of answer phrases for the case where no recognition phrase is found (null).

In the present example, when response processing for responding to the user, such as utterance to the user or an answer to the user in response to the user utterance, is executed, whether the utterance to the user or the response such as an answer is favorable for the user is evaluated from the user's voice, and the evaluation result is reflected in the priority.

For example, in the present example, when it is determined that the user shows a favorable reaction to the utterance or the response such as an answer to the user, the priority is increased by changing the priority of the response information corresponding to the utterance or the answer.

On the other hand, in the present example, when it is determined that the user does not show a favorable reaction to the utterance or the response such as an answer to the user, the priority is decreased by changing the priority of the response information corresponding to the utterance or the response such as an answer.

This processing of changing the priority increases the frequency of utterance or responses such as answers favorable for the user or suitable for the user.

Smooth communication with the user thus can be achieved.

(Response History Storage Portion)

FIG. 4 is a diagram illustrating response history storage portion 233 and voice data storage portion 234 based on the present first embodiment.

Referring to FIG. 4(A), response history storage portion 233 is stored in storage portion 203 of server 20 based on the present embodiment, by way of example.

Specifically, response history storage portion 233 stores information about response history of the cleaning robot. In the present example, information about response history is stored into response history storage portion 233 when response processing execution instruction portion 225 transmits answer phrase data that is a response content (response information) selected by selection portion 224, to cleaning robot 10 through communication portion 201.

Server 20 may manage each of a plurality of cleaning robots, and a unique identification number is allocated to each cleaning robot. In the present example, response history of cleaning robots with "10" and "11" allocated as IDs (device IDs) of cleaning robots are registered, by way of example.

Here, information including "time" of utterance, "response ID", "target of evaluation" is registered.

"Time" means the time when utterance is given to the user from server 20 through cleaning robot 10. Although the time means when utterance is given to the user in the present example, the time is not limited thereto and any time can be employed as long as the time for utterance processing (response processing) can be specified. For example, "time" may be the time when server 20 accepts input of voice data from the user or may be the time when voice recognition is carried out.

"Response ID" is information that specifies response information that server 20 utters to the user through cleaning robot 10, by way of example, and corresponds to the response ID of response content database 232.

"Target of evaluation" is information for determining whether to execute the processing of evaluating the user's reaction to the content of the utterance to the user that is received through cleaning robot 10. If evaluation is to be performed ("YES"), server 20 executes the evaluation processing on the subsequent user's reaction. On the other hand, if evaluation is not to be performed ("NO"), server 20 does not execute the evaluation processing on the subsequent user's reaction. For example, evaluation is not to be performed if the answer phrase is an answer phrase that requests a re-response such as "What did you say?" or "Say once again" by way of example. This is because the answer phrase that requests a re-response is considered not to require executing the processing of evaluating the user's reaction to change the priority. In the present example, the processing of evaluating the user's reaction is not executed for the re-response answer phrase. However, the processing of evaluating the user's reaction may be executed even for the re-response answer phrase to change the priority.

In the present example, for the device ID "10" of the cleaning robot, utterance based on response information corresponding to the response ID "1" was executed at the time "2013-09-12 06:30:42", by way of example. The target of evaluation is registered as YES". If the target of evaluation is "YES", the priority is changed by evaluating the reaction of the response to the user.

For the device ID "11" of the cleaning robot, utterance based on the response information corresponding to the response ID "100" was executed at the time "2013-09-12 06:30:45". Here, since the answer phrase corresponding to response ID "100" is a re-response answer phrase, the target of evaluation is registered as "No". If the target of evaluation is "No", server 20 does not execute the processing of changing the priority by evaluating the reaction to the response to the user.

Referring to FIG. 4(B), voice data storage portion 234 is provided in storage portion 203 of server 20 based on the present embodiment, by way of example.

Specifically, voice data storage portion 234 stores voice data received by voice input reception portion 221. In the present example, it is assumed that voice input reception portion 221 stores voice data into voice data storage portion 234.

Server 20 can manage each of a plurality of cleaning robots, and a unique identification number is allocated to each cleaning robot. In the present example, voice data of each of cleaning robots with "10" and "11" allocated as IDs of cleaning robots (device IDs) is registered by way of example.

Here, "time" and "voice data ID" of the received voice data are registered.

"Time" means the time when server 20 receives voice data from cleaning robot 10. Although "time" means the time when server 20 receives voice data from cleaning robot 10 in the present example, the time is not limited thereto and may be any time that can specify the time when voice data is received. For example, "time" may be the time when cleaning robot 10 accepts input of voice data from the user.

"Voice data ID" is an identification number allocated when voice data is stored into voice data storage portion 234. The identification number may be an address at which data is stored.

In the present example, for the device ID "10" of the cleaning robot, voice data received as voice data ID "100" at the time "2013-09-12 06:31:00" is stored, by way of example.

For the device ID "11" of the cleaning robot, voice data received as voice data ID "101" at the time "2013-09-12 06:31:10" is stored.

Voice data stored in voice data storage portion 234 is used in the processing of evaluating the user's reaction described later.

(Device Attribute Database)

FIG. 5 is a diagram illustrating device attribute database 231 based on the present first embodiment.

Referring to FIG. 5, device attribute database 231 is stored in storage portion 203 of server 20 based on the present first embodiment, by way of example.

Specifically, device attribute database 231 stores three reference values that serve as references of the manner of voice when the processing of evaluating the user's reaction to cleaning robot 10 is executed. Specifically, "sound volume", "rate of speech", "reply time" are shown. "Sound volume" means the level of magnitude of sound input to the microphone of cleaning robot 10. "Rate of speech" means the number of words spoken per minute. "Reply time" means the time taken for the user's reply to be input to the microphone for the response processing of cleaning robot 10.

For cleaning robot ID "10", sound volume "−35.3 dB", rate of speech "80 words/minute", reply time "8300 msec" are registered in server 20, by way of example.

For cleaning robot ID "11", sound volume "−31.9 dB", rate of speech "100 words/minute", reply time "5500 msec" are registered.

When the processing of evaluating the user's reaction is executed, the user's reaction can be evaluated appropriately by comparing the manner of voice of voice data of voice input that is the user's reply to the response processing of cleaning robot 10, with the reference value.

For example, server 20 compares the sound volume of voice data with the reference value of "sound volume" and, if the sound volume is greater, may determine that the user's reaction is good or the user's preference is met. If the sound volume is smaller, server 20 may determine that the user reaction is not good or the user's preference is not met.

The reference value may be the fixed one registered in advance by the user, or the result of calculating a mean value in accordance with the user reaction history in the past may be set as a reference value. Server 20 may provide a reference value depending on a user and evaluate the user reaction by comparing with the reference value to determine the user's preference appropriately.

(Response Processing)

Figure 6:
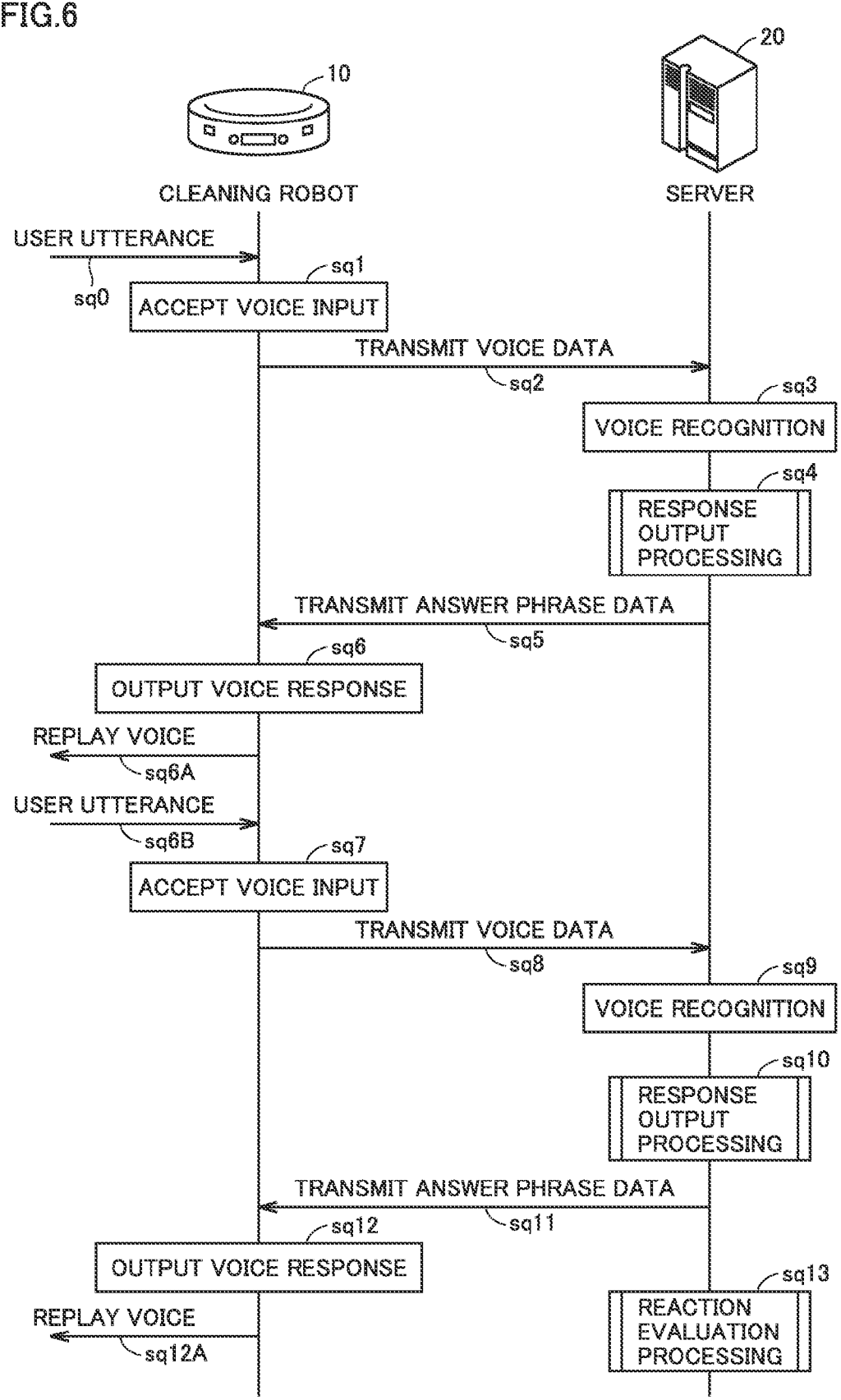
FIG. 6 is a sequence diagram illustrating the procedure of response processing in interactive system 1 based on the present first embodiment.

FIG. 6 is a sequence diagram illustrating the procedure of response processing in interactive system 1 based on the present first embodiment.

As shown in FIG. 6, the user utters to cleaning robot 10 (also referred to as user utterance) (processing sq0).

Cleaning robot 10 accepts input of voice for the user utterance (processing sq1). Specifically, voice input acceptance portion 114 accepts input of sound from the outside through microphone 103.

Cleaning robot 10 then outputs voice data to server 20 (processing sq2). Specifically, voice input acceptance portion 114 outputs voice data to server 20 through communication portion 101.

Server 20 then receives the voice data transmitted from cleaning robot 10 and executes voice recognition (processing sq3). Specifically, voice input reception portion 221 receives voice data through communication portion 201 and outputs the received voice data to voice recognition portion 223. Voice input reception portion 221 also stores the received voice data into voice data storage portion 234. Voice recognition portion 223 then recognizes the voice content. Voice recognition portion 223 then outputs the recognition result to selection portion 224.

Server 20 then executes the response output processing for determining an answer phrase based on the recognition result (processing sq4). Specifically, selection portion 224 determines an answer phrase and outputs the answer phrase to response processing execution instruction portion 225. The response output processing will be described later.

Server 20 then transmits the determined answer phrase data to cleaning robot 10 (processing sq5). Specifically, response processing execution instruction portion 225 transmits the answer phrase data determined by selection portion 224 to cleaning robot 10 through communication portion 201. In the present example, the answer phrase is a voice file, by way of example. It may be a file in text format. This is applicable to other examples.

Cleaning robot 10 then executes voice response output (processing sq6). Specifically, response processing execution portion 112 responses to the user (voice dialogue) through speaker 104, based on the answer phrase data received through communication portion 201. That is, response processing execution portion 112 responses by voice (utters) to the user through speaker 104 by replaying the voice file as answer phrase data (processing sq6A).

The user then utters (answers) to cleaning robot 10, as a reaction to the response processing from cleaning robot 10 (processing sq6B).

Cleaning robot 10 accepts input of voice from the user in response to the response processing (processing sq7). Specifically, voice input acceptance portion 114 accepts input of sound from the outside through microphone 103.

Cleaning robot 10 then outputs voice data to server 20 (processing sq8). Specifically, voice input acceptance portion 114 outputs voice data to server 20 through communication portion 101.

Server 20 then receives the voice data transmitted from cleaning robot 10 and executes voice recognition (processing sq9). Specifically, voice input reception portion 221 receives voice data through communication portion 201 and outputs the voice data to voice recognition portion 223. Voice input reception portion 221 also stores the received voice data into voice data storage portion 234. Voice recognition portion 223 then recognizes the voice content. Voice recognition portion 223 then outputs the recognition result to selection portion 224.

Server 20 then executes the response output processing for determining an answer phrase based on the recognition result (processing sq10). Specifically, selection portion 224 determines an answer phrase and outputs the answer phrase to response processing execution instruction portion 225. The response output processing will be described later.

Server 20 then transmits the determined answer phrase data to cleaning robot 10 (processing sq11). Specifically, response processing execution instruction portion 225 transmits the answer phrase data determined by selection portion 224 to cleaning robot 10 through communication portion 201.

Cleaning robot 10 then executes voice response output (processing sq12). Specifically, response processing execution portion 112 responses to the user (voice dialogue) through speaker 104, based on the answer phrase data received through communication portion 201. That is, response processing execution portion 112 responses by voice (utters) to the user through speaker 104 by replaying the voice file as answer phrase data (processing sq12A). Subsequently, the same processing is repeated.

On the other hand, in the present example, after processing sq11, server 20 executes the reaction evaluation processing for evaluating the reaction to the response processing from cleaning robot 10 (processing sq13). The reaction evaluation processing will be described later. In the present example, server 20 executes the reaction evaluation recessing after transmitting the determined answer phrase data to cleaning robot 10. However, the timing is not limited thereto and the reaction evaluation processing may be executed after processing sq8, that is, after the answer to the response processing from the user and before voice recognition at processing sq9, or the reaction evaluation processing may be executed concurrently with voice recognition in processing sq9.

(Response Output Processing)

Figure 7:
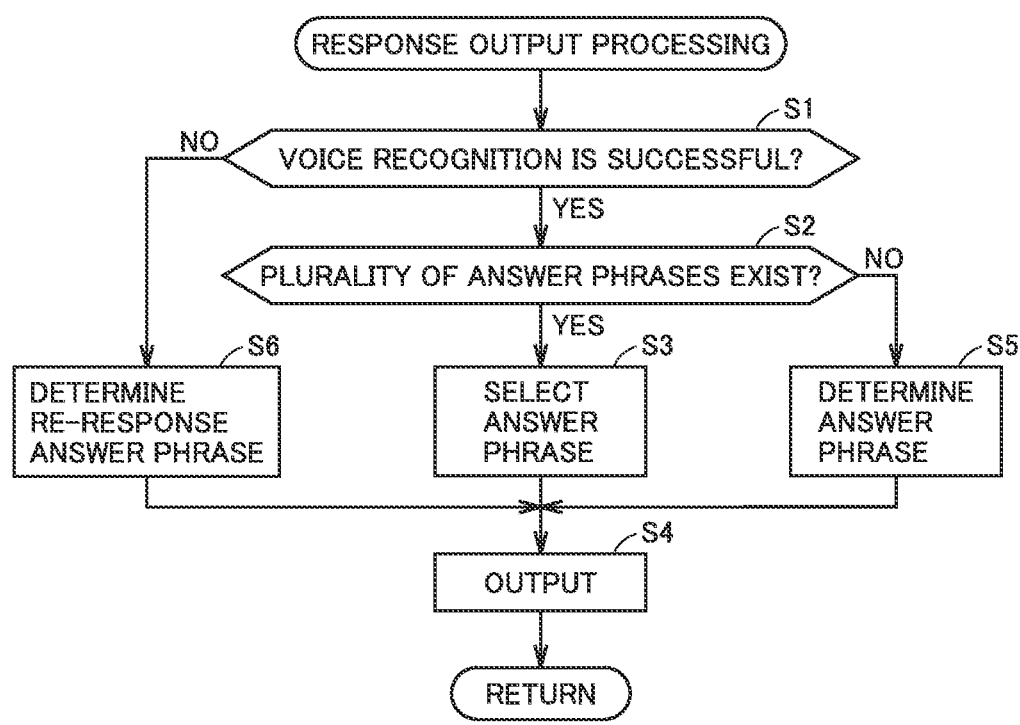
FIG. 7 is a flowchart for executing response output processing by a server 20 based on the present first embodiment.

FIG. 7 is a flowchart for executing the response output processing by server 20 based on the present first embodiment.

Referring to FIG. 7, this flowchart illustrates the processing executed through execution of a program stored in storage portion 109 to allow each portion in control unit 102 to function.

First, server 20 determines whether voice recognition is successful (step S1). Specifically, selection portion 224 determines whether a recognition phrase is provided as the voice recognition result from voice recognition portion 223.

If it is determined that voice recognition is successful in step S1 (YES in step S1), then server 20 determines whether there are a plurality of answer phrases (step S2). Specifically, selection portion 224 refers to response content database 232 (FIG. 3) to determine whether a plurality of answer phrases are registered corresponding to the recognition phrase.

If it is determined that there are a plurality of answer phrases in step S2 (YES in step S2), server 20 selects an answer phrase (step S3). Specifically, selection portion 224 refers to response content database 232 (FIG. 3) to select the answer phrase with a high priority corresponding to the recognition phrase, by way of example.

Server 20 then executes the output processing (step S4). Specifically, selection portion 224 outputs the selected answer phrase to response processing execution instruction portion 225. Response processing execution instruction portion 225 outputs the answer phrase data selected (determined) by selection portion 224 to cleaning robot 10 through communication portion 201.

Server 20 then ends the process (return).

On the other hand, if it is determined that there are not a plurality of answer phrases in step S2 (NO in step S2), server 20 determines an answer phrase (step S5). Specifically, selection portion 224 refers to response content database 232 (FIG. 3) to select (determine) the answer phrase corresponding to the recognition phrase.

Server 20 then executes the output processing (step S4). Specifically, selection portion 224 outputs the selected answer phrase to response processing execution instruction portion 225. Response processing execution instruction portion 225 outputs the answer phrase data selected (determined) by selection portion 224 to cleaning robot 10 through communication portion 201.

Server 20 then ends the process (return).

On the other hand, if it is determined that voice recognition is not successful in step S1 (NO in step S1), server 20 determines a re-response answer phrase (step S6).

Specifically, if it is determined that voice recognition is not successful, selection portion 224 refers to response content database 232 (FIG. 3) to select (determine) a re-response answer phrase corresponding to the case where no recognition phrase is found (null). For example, in order to obtain a response from the user again, for example, a re-response answer phrase such as "What did you say?" or "Say once again" is selected (determined). The phrase may not be such a re-response answer phrase but may be other phrases, for example, such as "Isn't it good?".

Server 20 then executes the output processing (step S4). Specifically, selection portion 224 outputs the selected answer phrase to response processing execution instruction portion 225. Response processing execution instruction portion 225 outputs the answer phrase data selected (determined) by selection portion 224 to cleaning robot 10 through communication portion 201.

Server 20 then ends the process (return).

With this processing, when there are plurality of corresponding answer phrases in response content database 232, the answer phrase with a high priority is selected and output from server 20 to cleaning robot 10 to produce utterance.

In the foregoing description, selection portion 224 refers to response content database 232 (FIG. 3) and outputs the re-response answer phrase corresponding to the case where no recognition phrase is found (null), to cleaning robot 10 through communication portion 201. However, the answer phrase data previously output may be output again by referring to response history storage portion 233.

In the present example described above, cleaning robot 10 utters based on the voice recognition result, by way of example of the response processing. However, the response processing is not limited to utterance (voice response) and, for example, display or running operation or any other response processing may be performed.

Voice recognition portion 223 may calculate reliability indicating correctness (the degree of being correct) of the recognition obtained as the recognition result (voice recognition result) of the voice content. If the reliability is low, it may be determined that no recognition phrase is found. As a method of determining reliability of a result of voice recognition by voice recognition portion 223, for example, a determination method prepared in advance, in which a matching score between a speech waveform model (an acoustic model) representing a plurality of prescribed words (phrases) and a waveform represented by voice data is determined and a highest matching score is adopted as reliability, can be employed. The present disclosure is not limited thereto and other methods may be used.

When the response processing from cleaning robot 10 is executed based on the answer phrase data from server 20, the response processing may possibly take time. Therefore, the robot may be allowed to utter voice such as "er" or to perform other response processing, so that uncomfortable feeling to the user is mitigated and the user may feel affinity to cleaning robot 10. Namely, smoother communication can be achieved. Such response processing as utterance of such stopgap voice may be performed every certain period of time. Such response processing may be a predetermined response or may be selected from among several patterns, or may randomly be selected. Such response processing as utterance of stopgap voice is preferably executed by cleaning robot 10 in terms of response speed but may be executed under an instruction from server 20. Specifically, in processing sq2 in the sequence diagram in FIG. 6, when server 20 receives voice data from cleaning robot 10, server 20 may instruct cleaning robot 10 to execute such response processing as utterance of stopgap voice. This processing is similarly applicable to the following embodiments.

(Reaction Evaluation Processing)

Figure 8:
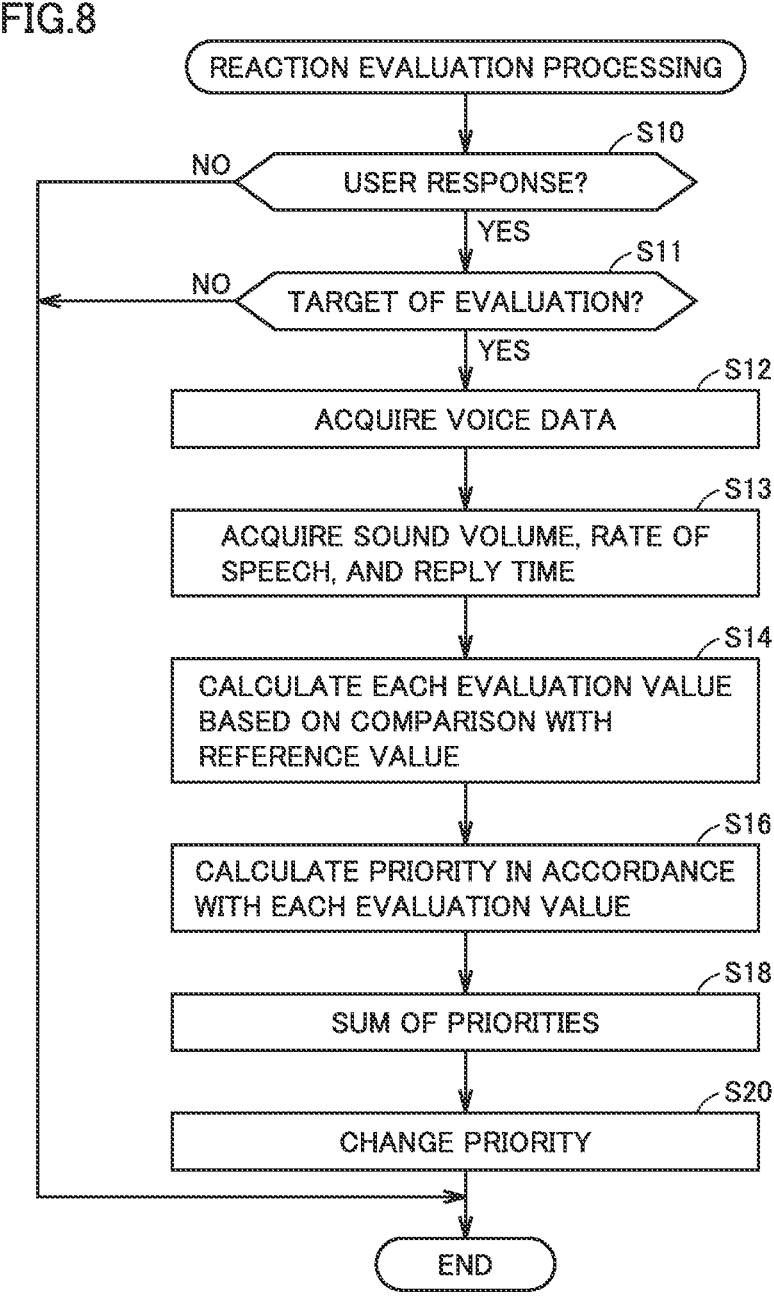
FIG. 8 is a flowchart for executing reaction evaluation processing by server 20 based on the present first embodiment.

FIG. 8 is a flowchart for executing the reaction evaluation processing by server 20 based on the present first embodiment.

Referring to FIG. 8, this flowchart illustrates the processing executed by evaluation portion 222 of control unit 202 through execution of a program stored in storage portion 203.

First, server 20 determines whether a user response is made (step S10). Specifically, evaluation portion 222 determines whether a user response is made based on the data stored in response history storage portion 233 and voice data storage portion 234 illustrated in FIG. 4. In this respect, evaluation portion 222 determines whether a user response is made immediately when cleaning robot 10 outputs an answer phrase. Evaluation portion 222 determines immediate or not, for example, based on whether a response is made within 30 seconds.

For example, referring to FIG. 4(A), for device ID "10", utterance based on response information corresponding to response ID "1" was executed at the time "2013-09-12 06:30:42".

Referring to FIG. 4(B), for device ID "10", the voice data received as voice data ID"100" at the time "2013-09-12 06:31:00" was stored.

Whether a user response is made immediately can be determined by comparing the times in FIGS. 4(A) and 4(B). In the present example, server 20 can determine that a user response is made immediately.

If it is determined that a user response is made in step S10 (YES in step S10), server 20 then determines whether evaluation is to be performed (step S11). Specifically, evaluation portion 222 determines whether evaluation is to be performed, based on the data stored in response history storage portion 233 as illustrated in FIG. 4(A). Server 20 determines whether the target of evaluation corresponding to the response ID is set "YES" and, if "YES", determines that evaluation is to be performed. On the other hand, if "NO", it is determined that evaluation is not to be performed.

If the target of evaluation is set "NO", that is, if a user reaction is made in response to the response information having the response ID corresponding to the re-response answer phrase, server 20 may execute the reaction evaluation processing for the response information having the response ID for the answer phrase previous to the re-response answer phrase. Accordingly, when an answer for the response phrase that requests a re-response is made, the evaluation on the response processing of cleaning robot 10 can be reflected appropriately.

If it is determined that evaluation is to be performed in step S11 (YES in step S11), server 20 acquires voice data (step S12). Specifically, evaluation portion 222 acquires the immediate voice data stored in voice data storage portion 234 as illustrated in FIG. 4(B).

Server 20 then acquires the sound volume, the rate of speech, and the reply time (step S13). Specifically, evaluation portion 222 acquires the sound volume, the rate of speech, and the reply time as the manner of voice of the voice data acquired from voice data storage portion 234. It is noted that evaluation portion 222 calculates the rate of speech based on information of the recognition result (recognition content) in voice recognition portion 223.

Server 20 then calculates each evaluation value based on the comparison between the acquired sound volume, rate of speech, and reply time and the reference values (step S14). Specifically, evaluation portion 222 calculates each evaluation value of "sound volume", "rate of speech", and "reply time" by comparing them with the reference values stored in device attribute database 231 in FIG. 5.

Server 20 then calculates the priority in accordance with each evaluation value (step S16). Specifically, evaluation portion 222 calculates the priority based on the following table.

FIG. 9 is a table illustrating the correspondence between evaluation value and priority based on the present first embodiment.

FIG. 9(A) shows the relation between evaluation value X and priority.

When the value of evaluation value X is high, it is determined that the user's preference is met. When the value of evaluation value X is low, it is determined that the user's preference is not met. For example, the determination described above is applied to the "rate of speech", by way of example.

The evaluation value "1.5<X" is related with priority "+30", by way of example.

The evaluation value "1.3<X≤1.5" is related with priority "+20". The evaluation value "1.1<X≤1.3" is related with priority "+10".

The evaluation value "0.9≤X≤1.1" is related with priority "0".

The evaluation value "0.8≤X<0.9" is related with priority "−10".

The evaluation value of "0.7≤X<0.8" is related with priority "−20".

The evaluation value "X<0.7" is related with priority "−30".

FIG. 9(B) shows the relation between evaluation value Y and priority.

When the value of evaluation value Y is low, it is determined that the user's preference is met. When the value of evaluation value Y is high, it is determined that the user's preference is not met. For example, the determination described above is applied to "sound volume" and "reply time", by way of example.

The evaluation value "1.5<Y" is related with priority "−30", by way of example.

The evaluation value "1.3<Y≤1.5" is related with priority "−20". The evaluation value "1.1<Y≤1.3" is related with priority "−10".

The evaluation value "0.9≤Y≤1.1" is related with priority "0".

The evaluation value "0.8≤Y≤0.9" is related with priority "+10".

The evaluation value "0.7≤Y<0.8" is related with priority "+20".

The evaluation value "Y<0.7" is related with priority "+30".

In the present example described above, when evaluation value Y is low, it is determined that the user's preference is met, and the priority is set high. The reason why this relation is applied to "sound volume" is that the magnitude of sound volume is defined by a negative value as illustrated in FIG. 5. When the magnitude of sound volume is defined by a positive value, the table in FIG. 9(A) may be used.

Referring to FIG. 9 (C), recognition phrases are each related with a priority.

Specifically, the recognition phrase "Thank you" is related with priority "+30". The recognition phrase "Great" is related with priority "+20". The recognition phrase "Terrific" is related with priority "+20". The recognition phrase "Boring" is related with priority "−20". The recognition phrase "No, thank you" is related with priority "−20". The recognition phrase "Shut up" is related with priority "−10".

The value of priority could be appropriately set to a proper value by those skilled in the art.

Referring to FIG. 8 again, next, server 20 sums up the priorities (step S18).

Server 20 then changes the priority of the answer phrase corresponding to the recognition phrase in accordance with the sum of priorities (step S20).

Server 20 then ends the process (END).

On the other hand, if it is determined that no user response is made in step S10 (NO in step S10) or if it is determined that evaluation is not to be performed in step S11 (NO in in step S11), server 20 ends the process without executing the evaluation processing (END).

FIG. 10 is a diagram illustrating changing the priority based on the present first embodiment.

Referring to FIG. 10(A), here, the reference values of "sound volume", "rate of speech", and "reply time" are shown. Specifically, the reference values "−35.3" for "sound volume", "80" for "rate of speech", and "8300" for "reply time" are shown.

Referring to FIG. 10(B), here, the acquired values of "sound volume", "rate of speech", and "reply time" are shown. Specifically, the acquired values "−31" for "sound volume", "90" for "rate of speech", and "9500" for "reply time" are shown.

Referring to FIG. 10(C), the evaluation value obtained by dividing the acquired value by the reference value is shown.

Specifically, the evaluation value for "sound volume" is "0.878", the evaluation value for "rate of speech" is "1.125", and the evaluation value for "reply time" is "1.145".

The priority for "sound volume" is priority "+10" with reference to FIG. 9(B), the priority of "rate of speech" is priority "+10" with reference to FIG. 9(A), and the priority of "reply time" is priority "−10" with reference to FIG. 9(B).

Based on the foregoing, the sum of priorities is "+10".

The priority corresponding to the answer phrase in response content database 232 is then changed.

For example, as the result of the reaction evaluation processing, priority "+10" is calculated as the answer to the response processing for the answer phrase "Good morning! Good luck today!" corresponding to the recognition phrase "Good Morning" with response ID "1".

Evaluation portion 222 changes priority "20" corresponding to response ID "1" in response content database 232 in FIG. 3 to "30" by adding "+10".

The priority of the response ID in response content database 232 is thus changed and the answer phrase is more likely to be selected for the next recognition phrase, so that utterance can be given by selecting (determining) the answer phrase that meets the user's preference.

Although changing the priority in relation with a recognition phrase using FIG. 9 (C) has not been described, evaluation portion 222 in the present example may adjust the priority using that correspondence table.

Evaluation portion 222 in the present example described above changes the priority by calculating the respective evaluation values of "sound volume", "rate of speech", "reply time" based on the comparison with the reference values stored in device attribute database 231 in FIG. 5. Alternatively, evaluation portion 222 may change the priority by calculating the evaluation value based on at least one of information included in voice data. For example, evaluation portion 222 may evaluate "sound volume" alone or may evaluate a combination of "sound volume" and "recognition phrase". By combining multiple pieces of information, the nuance of the user's reply to the response processing of cleaning robot 10 can be evaluated and determined precisely.

The method of calculating the priority is not limited to the method described above and a variety of methods can be employed. For example, although the corresponding priority is calculated for each evaluation value in the foregoing description, the priority may be calculated for the evaluation value obtained by multiplying the evaluation values.

Although interactive system 1 is configured such that cleaning robot 10 and server 20 operate in cooperation in the present example described above, an interactive device may be implemented such that cleaning robot 10 includes the functions such as voice recognition of server 20 and operates standalone.

<Second Embodiment>

In the foregoing first embodiment, cleaning robot 10 gives utterance by selecting the answer phrase with a high priority for a recognition phrase.

Any response processing other than utterance may be executed as a response mode to a recognition phrase.

FIG. 11 is a diagram illustrating a response content database based on the present second embodiment.

Referring to FIG. 11(A), response content database 232A is stored in storage portion 203 of server 20 based on the present embodiment, by way of example.

Specifically, a recognition content (recognition phrase) and a response mode as a response content are registered in association with each other in response content database 232A. In the present example, an identification number is allocated to each combination of a recognition phrase and a response mode.

Here, response modes are stored in association with a recognition phrase "Good Morning", by way of example.

For example, the response mode "operation pattern 1" is registered in association with the recognition phrase "Good Morning" for response ID 1.

The response mode "operation pattern 2" is registered in association with the recognition phrase "Good Morning" for response ID 2.

The response mode "operation pattern 3" is registered in association with the recognition phrase "Good Morning" for response ID 3.

Here, the response modes "operation pattern 1 " to "operation pattern 3" mean that server 20 instructs cleaning robot 10 to execute a motion (moving processing) in a predetermined operation pattern.

For example, "operation pattern 1" means a pattern in which drive portion 106 allows cleaning robot 10 to repeatedly make a reciprocating motion in the front-to-back longitudinal direction for a predetermined period.

"Operation pattern 2" means a pattern in which drive portion 106 allows cleaning robot 10 to repeatedly make a reciprocating motion in the left-to-right traverse direction for a predetermined period.

"Operation pattern 3" means a pattern in which drive portion 106 allows cleaning robot 10 to repeatedly make a predetermined circular motion for a predetermined period.

In the present example, the priority is related with the response mode corresponding to each recognition phrase.

The priority is used as an index for determining the degree of being selected in a case where a plurality of response modes are provided for the same recognition phrase. That is, selection portion 224 selects the response mode corresponding to the response ID with a high priority.

Cleaning robot 10 then executes the response processing in accordance with the selected response mode, in the same manner as described above. It is then determined whether the response processing is favorable for the user, based on the user's voice, and the evaluation result is reflected in the priority.

For example, when it is determined that the operation pattern of cleaning robot 10 is favorable for the user as a response mode to the user, server 20 increases the priority by changing the priority of that response mode.

On the other hand, when it is determined that the operation pattern of cleaning robot 10 is not favorable for the user as a response mode to the user, server 20 decreases the priority by changing the priority of that response mode.

This priority changing processing increases the frequency of responses in a response mode favorable for the user or suitable for the user.

Smooth communication with the user thus can be achieved.

Although the operation pattern using drive portion 106 of cleaning robot 10 is used as a response mode to a recognition phrase in the foregoing description, server 20 may execute display processing, instead of the operation processing, as a response mode.

Referring to FIG. 11(B), response content database 232B is stored in storage portion 203 of server 20 based on the present embodiment, by way of example.

Specifically, a recognition content (recognition phrase) and a response mode as a response content are registered in association with each other in response content database 232B. In the present example, an identification number is allocated to each combination of a recognition phrase and a response mode.

Here, response modes are stored in association with "Good Morning" as a recognition phrase, by way of example.

For example, a response mode "display pattern 1" is registered in association with the recognition phrase "Good Morning" for identification number ID 1.

A response mode "display pattern 2" is registered in association with the recognition phrase "Good Morning" for identification number ID 2.

A response mode "display pattern 3" is registered in association with the recognition phrase "Good Morning" for identification number ID 3.

Here, the response modes "display pattern 1" to "display pattern 3" mean that server 20 instructs cleaning robot 10 to execute the processing (display processing) in a predetermined display pattern.

For example, "display pattern 1" means a pattern in which the timing of turning on/off display portion 108 of cleaning robot 10 is repeatedly executed at first predetermined intervals.

"Display pattern 2" means a pattern in which the timing of turning on/off display portion 108 of cleaning robot 10 is repeatedly executed at second predetermined intervals shorter than the first predetermined intervals.

"Display pattern 3" means a pattern in which display portion 108 of cleaning robot 10 is kept on for a predetermined period.

The priority is related with the response mode corresponding to each recognition phrase, in the present example.

This priority is used as an index for determining the degree of being selected in a case where a plurality of response modes are provided for the same recognition phrase. That is, selection portion 224 selects the response mode corresponding to the response ID with a high priority.

The one with a high priority may not necessarily be selected but the probability of being selected may be relatively increased. This processing can achieve smooth communication with the user while avoiding patterned response contents.

In the present example, cleaning robot 10 executes the response processing in accordance with the selected response mode. It is then determined whether the response processing is favorable for the user, based on the user's voice, and the evaluation result is reflected in the priority.

For example, if it is determined that the display pattern of cleaning robot 10 is favorable for the user as a response mode to the user, server 20 increases the priority by changing the priority of that response mode.

On the other hand, if it is determined that the display pattern of cleaning robot 10 is not favorable for the user as a response mode to the user, server 20 decreases the priority by changing the priority of that response mode.

This priority changing processing increases the frequency of responses in a response mode favorable for the user or suitable for the user.

Smooth communication with the user thus can be achieved.

<Third Embodiment>

Response content database 232 stored in storage portion 203 of server 20 as described above can be provided in relation with each of a plurality of cleaning robots 10.

A plurality of cleaning robots 10 may share a single response content database. In this case, the priority of a response mode is changed in accordance with the reaction of users who use cleaning robots 10, so that a response suitable for general users or favorable for users can be made, thereby achieving smooth communication with the user.

Response content database 232 may be provided not for each cleaning robot 10 but for each user who uses it.

FIG. 12 is a diagram illustrating a user table 235 based on the present third embodiment.

Referring to FIG. 12, in user table 235, a user ID is allocated to each user. Specifically, user IDs "001A", "002A", "003A", and "004A" are allocated to the names "Yoshiko", "Hanako", "Keiko", and "Tomozo", respectively. "Gender ", "age bracket", and "response content database" are registered for each user.

Specifically, in user table 235, user ID "001A", name "Yoshiko", gender "female", age bracket "10's", and response content database "DB1" are registered. User ID "002A", name "Hanako", gender "female", age bracket "20's", and response content database "DB2" are registered. User ID "003A", name "Keiko", gender "female", age bracket "30's to 50's", and response content database "DB3" are registered. User ID "004A", name "Tomozo", gender "male", age bracket "60's", and response content database "DB4" are registered.

Here, response content databases DB1 to DB4 may be common databases provided on an age bracket basis. The use of a common database for each age bracket enables a response in a pattern suitable for the user's age bracket and can achieve smooth communication with the user.

The response content databases are classified according to age bracket in the present example. However, the response content databases may be classified according to gender.

To create the user table, each user may register in user table 235 stored in server 20 or the administrator may store. "Gender" and "age bracket" may be registered by determining "gender" and "age bracket" based on the voice data received by voice input reception portion 221, rather than entering by the user.

Although it is assumed that a user uses a single cleaning robot 10 in the present example, by way of example, a plurality of users may use a single cleaning robot 10, as a matter of course.

In such a case, as a method of determining which user is using, voice data of prospective users may be registered in advance, and which user is using may be determined by voiceprint recognition.

Wen authentication is performed through voiceprint recognition, a response content database suitable for the corresponding user can be set.

<Fourth Embodiment>

Although the response content database provided in cleaning robot 10 has been described above, the response content database can be applied similarly to equipment other than cleaning robot 10.

In the present fourth embodiment, an interactive system 1A including a television 10A and server 20 will be described.

In interactive system 1A, when voice is output from television 10A to a person (user), and voice uttered by the person (user) in response is input to television 10A and recognized in server 20, a response content for the input voice is output from television 10A, by way of example. By repeating this processing, interactive system 1A according to the present embodiment realizes pseudo communication between the user and television 10A.

(Configuration of Main Portion of Interactive System 1A)

Figure 13:
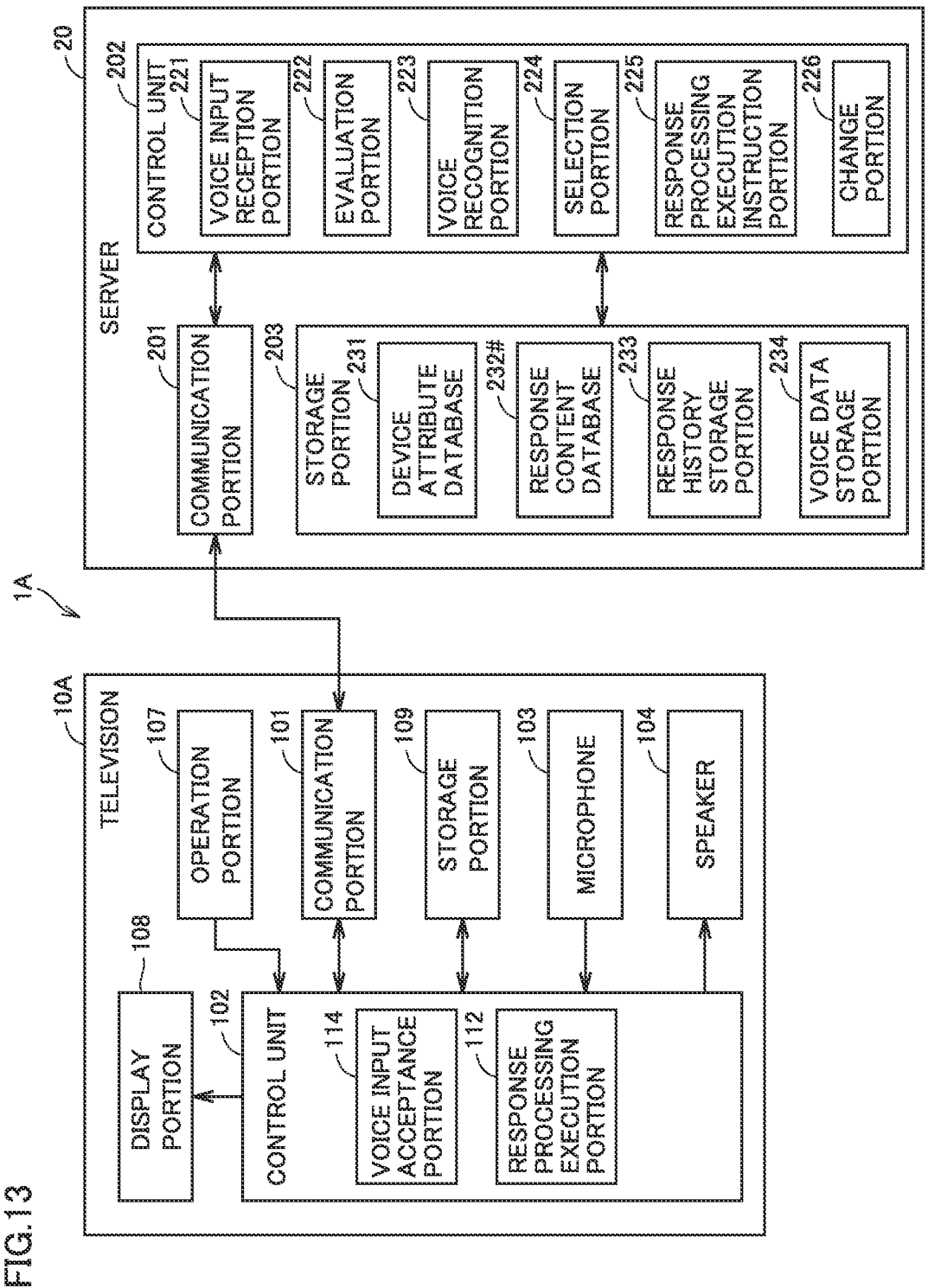
FIG. 13 is a diagram illustrating a configuration of a main portion of an interactive system 1A based on the present fourth embodiment.

FIG. 13 is a diagram illustrating a configuration of a main portion of interactive system 1A based on the present fourth embodiment.

Referring to FIG. 13, interactive system 1A differs from interactive system 1 in that cleaning robot 10 is replaced by television 10A.

Television 10A based on the present fourth embodiment includes a communication portion 101, a control unit 102, a microphone 103, a speaker 104, a display portion 108, and a storage portion 109 and differs from cleaning robot 10 in that cleaning portion 105 and drive portion 106 are not provided. Except for this, the configuration is the same as described above and a detailed description thereof is not repeated.

FIG. 14 is a diagram illustrating a response content database based on the present fourth embodiment.

Referring to FIG. 14, a response content database 232# is stored in storage portion 203 of server 20 based on the present fourth embodiment, by way of example.

Specifically, a recognition content (recognition phrase) and a response mode as a response content are registered in association with each other in response content database 232#. In the present example, an identification number is allocated to each combination of a recognition phrase and a response mode.

Here, response modes are associated with "How's the weather?" as a recognition phrase, by way of example.

For example, a response mode "Turn on TV (ch1)" is registered in association with the recognition phrase "How's the weather?" for response ID 1.

A response mode "Turn on TV (ch2)" is registered in association with the recognition phrase "How's the weather?" for response ID 2.

A response mode "Access TV site (URL (Uniform Resource Locator))" is registered in association with the recognition phrase "How's the weather?" for response ID 3.

Here, the response modes "Turn on TV (ch1)"and " Turn on TV (ch2)" mean that server 20 instructs TV 10A to execute a motion (operation processing) in a predetermined operation pattern.

For example, "Turn on TV (ch1)" means the processing of allowing control unit 102 to set the TV channel (ch) to channel "ch1" and display on display portion 108.

"Turn on TV (ch2)" means the processing of allowing control unit 102 to set the TV channel (ch) to channel "ch2" and display on display portion 108.

"Access weather site (URL)" means the processing of acquiring weather information in accordance with access information (URL) to enable access to a predetermined server capable of acquiring weather information, and outputting the acquired weather information.

The priority is related with the response mode corresponding to each recognition phrase in the present example.

The priority is used as an index for determining the degree of being selected in a case where a plurality of response modes are provided for the same recognition phrase. That is, the response mode corresponding to the identification number ID with a high priority is selected.

The one with a high priority may not necessarily be selected but the probability of being selected may be relatively increased. This processing can achieve smooth communication with the user while avoiding patterned response contents.

Television 10A then executes the response processing in accordance with the selected response mode in the same manner as described above. It is then determined whether the response processing is favorable for the user, based on the user's voice, and the evaluation result is reflected in the priority.

For example, if it is determined that the operation pattern of television 10A is favorable for the user as a response mode for the user, server 20 increases the priority by changing the priority of that response mode.

On the other hand, if it is determined that the operation pattern of television 10A is not favorable for the user as a response mode for the user, server 20 decreases the priority by changing the priority of that response mode.

This priority changing processing increases the frequency of responses in a response mode favorable for the user or suitable for the user.

For example, in the present example, selection portion 224 refers to response content database 232# to select the response mode "Turn on TV (ch1)" in relation with the recognition phrase "How's the weather?" with a high priority. Server 20 then allows the evaluation result to be reflected in the priority based on the user's reply to the response processing.

The priority changing processing therefore allows execution of a response mode that meets the user's preference and can achieve smooth communication with the user.

<Fifth Embodiment>

Figure 15:
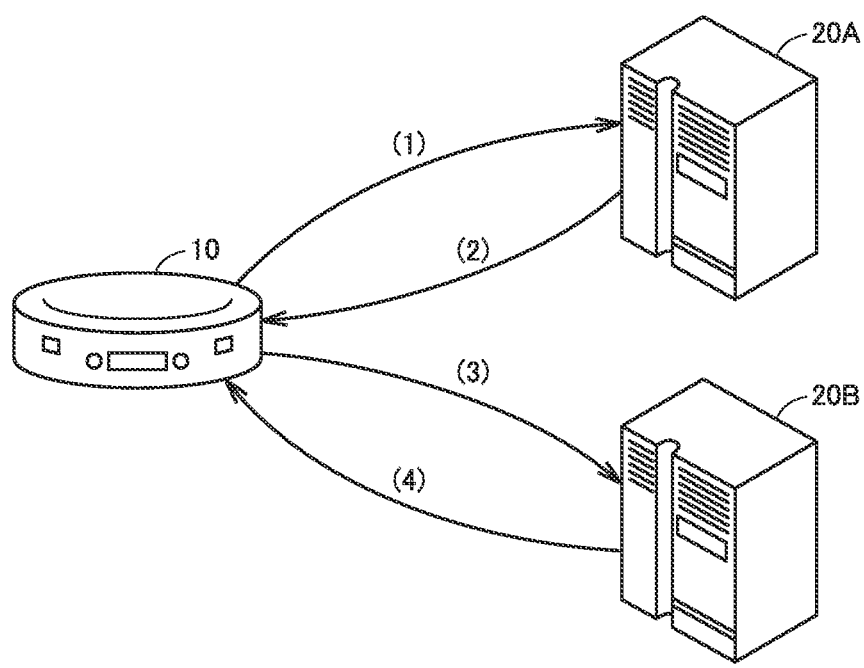
FIG. 15 is a diagram illustrating a configuration of servers based on the present fifth embodiment.

FIG. 15 is a diagram illustrating a configuration of servers based on the present fifth embodiment.

Referring to FIG. 15, a plurality of servers are provided in the present example.

In the present example, a server 20A and a server 20B are provided by way of example.

Although the processing of voice recognition and the processing of determining an answer phrase (response mode) for the voice recognition are executed in the same server in the configuration described above, each processing may be executed in an independent server.

Specifically, server 20A may execute voice recognition of voice data, while server 20B may output answer phrase data to cleaning robot 10.

For example, cleaning robot 10 transmits voice data to server 20A (1). Server 20A executes voice recognition of voice data. Server 20A then transmits a recognition phrase to cleaning robot 10 (2).

Cleaning robot 10 receives the recognition phrase from server 20A and transmits the recognition phrase to another server 20B (3).

Server 20B receives the recognition phrase from cleaning robot 10 and determines the answer phrase corresponding to the recognition phrase. Server 20B then transmits the answer phrase data to the cleaning robot (4).

In the present example described above, server 20A transmits a recognition phrase obtained by executing voice recognition of voice data to cleaning robot 10. However, any information that indicates the result of voice recognition may be transmitted instead of a recognition phrase. An example of such information is access information (for example, URL (Uniform Resource Locator)) required to access an answer phrase stored in server 20B. For example, cleaning robot 10 may receive the access information (URL) from server 20A and access server 20B to acquire an answer phrase from server 20B. Instead of access information, if an answer phrase stored in server 20B is saved in a file format, information designating the file name may be used as information indicating the result of voice recognition from server 20A. For example, cleaning robot 10 may receive the file name from server 20A and request information from server 20B with the designated file name to acquire the file related with the answer phrase from server 20B.

Similarly, server 20A may transmit text information obtained by converting a recognition phrase into text, as information indicating the result of voice recognition from server 20A. Cleaning robot 10 may extract the recognition phrase from the text information and acquire an answer phrase by accessing server 20B. Alternatively, cleaning robot 10 may transmit the text information to server 20B and server 20B may analyze the text information including a recognition phrase, determine an answer phrase based on the analysis result, and transmit the determined answer phrase to cleaning robot 10.

In the configuration described above, answer phrase data is transmitted from server 20B to cleaning robot 10. Specifically, a voice file as answer phrase data is transmitted, and cleaning robot 10 utters in accordance with the voice file. However, server 20B may transmit text information as answer phrase data instead of a voice file, and cleaning robot 10 may analyze the text information (for example, dictation function) to give utterance (response processing).

Although server 20 carries out voice recognition in the present example described above, cleaning robot 10 may carry out voice recognition, determine the answer phrase corresponding to the result in cleaning robot 10 per se, and acquire the answer phrase from server 20B. In this case, a URL correspondence table in which access information (URL) for accessing an answer phrase in server 20B is related with a recognition phrase may be provided in storage portion 109 to realize utterance.

The answer phrase for the result of voice recognition may be acquired using information stored in cleaning robot 10.

For example, when information of the answer phrase for the recognition phrase that is previously used is included in a cash memory capable of temporarily storing information, for example, utterance (response processing) may be given from cleaning robot 10 by acquiring the answer phrase using information of the answer phrase stored in the cash memory without accessing server 20B. Utterance thus can be given promptly using the information stored in the cash memory.

When a voice file as an answer phrase is stored in cleaning robot 10, server 20A may designate the voice file stored in cleaning robot 10 as information indicating the result of voice recognition. This processing enables prompt utterance using the voice file stored in cleaning robot 10, without accessing server 20B. When the voice file is not stored in cleaning robot 10, cleaning robot 10 may request the designated voice file from server 20B and acquire the voice file from server 20B to give utterance.

The configuration of the server in the present fifth embodiment can be applied to any of the foregoing first to fourth embodiments.

<Sixth Embodiment>

The control block of cleaning robot 10, server 20, and others may be implemented by a logic circuit (hardware) formed, for example, in an integrated circuit (IC chip) or may be implemented by software using a CPU (Central Processing Unit).

In the latter case, cleaning robot 10 and server 20 include a CPU for executing program instructions as software implementing each function, a ROM (Read Only Memory) or a storage device (these are referred to as "recording medium") encoded with the program or various data in a computer (or CPU) readable form, and a RAM (Random Access Memory) for expanding the program. The computer (or CPU) reads out and executes the program from the recording medium to achieve the object of the present disclosure. Examples of the recording medium include "non-transitory tangible media" such as tapes, disks, cards, semiconductor memories, and programmable logic circuits. The program may be supplied to the computer through any transmission medium capable of transmitting the program (for example, communication networks and broadcasting waves). It is noted that the present disclosure may be implemented in the form of a data signal embedded in a carrier wave that embodies the program through electronic transmission.

(Summary)

Server 20 according to a first aspect of the present disclosure is provided to be able to communicate with an interactive device (cleaning robot 10). The server 20 includes a storage portion 203 for storing a plurality of response information about operation of the interactive device responsive to a user, each associated with a priority serving as an index when being selected, selection portion 224 for selecting one response information in accordance with the priorities of the plurality of response information stored in the storage portion, response processing execution instruction portion 225 for instructing the interactive device to execute response processing based on the response information selected by selection portion 224, voice input reception portion 221 for receiving voice input for the response processing from the user, evaluation portion 222 for evaluating the user's reaction to the response processing based on the manner of voice of the voice input accepted by voice input reception portion 221, and change portion 226 for changing the priority of the selected response information stored in storage portion 203 based on the evaluation result from evaluation portion 222.

In the configuration above, evaluation portion 222 evaluates the user's reaction to the response processing based on the manner of voice of the voice input. Change portion 226 changes the priority of the selected response information stored in storage portion 203 based on the evaluation result. Changing the priority then increases the possibility that the response information that meets the user's preference is selected and can achieve smooth communication with the user.

Evaluation portion 222 of server 20 according to a second aspect of the present disclosure evaluates the user's reaction to the response processing based on at least one of a reply time to the response processing, sound volume, and rate of speech as the manner of voice of the voice input accepted by voice input reception portion 221.

Change portion 226 of server 20 according to a third aspect of the present disclosure increases the priority if it is determined that the reaction is good as an evaluation result from evaluation portion 222, and decreases the priority if it is determined that the reaction is bad.

Response processing execution instruction portion 225 of server 20 according to a fourth aspect of the present disclosure may give an instruction to execute response processing for prompting a re-response from the user if voice input is not accepted by voice input reception portion 221 as a reply to the response processing from the user.

Server 20 according to a fifth aspect of the present disclosure further includes voice recognition portion 223 for carrying out voice recognition of voice input. Response processing execution instruction portion 225 may give an instruction to execute response processing for prompting a re-response from the user if voice recognition by voice recognition portion 223 is failed.

An interactive device (cleaning robot 10) according to a sixth aspect of the present discloser includes storage portion 203 for storing a plurality of response information about the manner of operation responsive to a user, each associated with a priority serving as an index when being selected, selection portion 224 for selecting one response information in accordance with the priorities of the plurality of response information stored in storage portion 203, response processing execution portion 112 for executing response processing for the user based on the response information selected by selection portion 224, voice input acceptance portion 114 for accepting voice input as a response to the response processing from the user, evaluation portion 222 for evaluating a user's reaction to the response processing based on the manner of voice of the voice input accepted by voice input acceptance portion 114, and change portion 226 for changing the priority of the selected response information stored in storage portion 203 based on the evaluation result from evaluation portion 222.

In the configuration above, evaluation portion 222 evaluates the user's reaction to the response processing based on the manner of voice of the voice input. Change portion 226 changes the priority of the selected response information stored in storage portion 203 based on the evaluation result. Changing the priority then increases the possibility that the response information that meets the user's preference is selected and can achieve smooth communication with the user.

Interactive system 1 according to a seventh aspect of the present disclosure includes storage portion 203 for storing a plurality of response information about the manner of operation responsive to a user, each associated with a priority serving as an index when being selected, selection portion 224 for selecting one response information in accordance with the priorities of the plurality of response information stored in storage portion 203, response processing execution portion 112 for executing response processing for the user based on the response information selected by selection portion 224, voice input acceptance portion 114 for accepting voice input for the response processing from the user, evaluation portion 222 for evaluating the user's reaction to the response processing based on the manner of voice of the voice input accepted by voice input acceptance portion 114, and change portion 226 for changing the priority of the selected response information stored in storage portion 203 based on the evaluation result from evaluation portion 222.

In the configuration above, evaluation portion 222 evaluates the user's reaction to the response processing based on the manner of voice of the voice input. Change portion 226 changes the priority of the selected response information stored in storage portion 203 based on the evaluation result. Changing the priority then increases the possibility that the response information that meets the user's preference is selected and can achieve smooth communication with the user.

Interactive system 1 according an eighth aspect of the present disclosure includes server 20 provided to be able to communicate with an interactive device (cleaning robot 10). Server 20 includes storage portion 203 for storing a plurality of response information about the manner of operation responsive to a user, each associated with a priority serving as an index when being selected, and selection portion 224 for selecting one response information in accordance with the priorities of the plurality of response information stored in storage portion 203. The interactive device includes response processing execution portion 112 for executing response processing for the user based on the response information selected by selection portion 224, and voice input acceptance portion 114 for accepting voice input for the response processing from the user. The server further includes evaluation portion 222 for evaluating the user's reaction to the response processing based on the manner of voice of the voice input accepted by voice input acceptance portion 114, and change portion 226 for changing the priority of the selected response information stored in storage portion 203 based on the evaluation result from evaluation portion 222.

In the configuration above, evaluation portion 222 evaluates the user's reaction to the response processing based on the manner of voice of the voice input. Change portion 226 changes the priority of the selected response information stored in storage portion 203 based on the evaluation result. Changing the priority then increases the possibility that the response information that meets the user's preference is selected and can achieve smooth communication with the user.

An interaction method according to a ninth aspect of the present disclosure includes the steps of: referring to a storage portion storing a plurality of response information about the manner of operation responsive to a user, each associated with a priority serving as an index when being selected, and selecting one response information in accordance with the priorities of the plurality of response information (processing sq4, step S3); executing response processing for the user based on the selected response information (processing sq6); accepting voice input for the response processing from the user (processing sq8); evaluating the user's reaction to the response processing based on the manner of voice of the accepted voice input (processing sq13); and changing the priority of the selected response information stored in the storage portion based on the evaluation result (step S20).

In the method above, the user's reaction to the response processing is evaluated based on the manner of voice of the voice input, and the priority of the selected response information stored in storage portion 203 is changed based on the evaluation result. Changing the priority then increases the possibility that the response information that meets the user's preference is selected and can achieve smooth communication with the user.

An interaction program according to a tenth aspect of the present disclosure causes a computer to execute processing including the steps of: referring to a storage portion storing a plurality of response information about the manner of operation responsive to a user, each associated with a priority serving as an index when being selected, and selecting one response information in accordance with the priorities of the plurality of response information (processing sq4, step S3); executing response processing for the user based on the selected response information (processing sq6); accepting voice input for the response processing from the user (processing sq8); evaluating the user's reaction to the response processing based on the manner of voice of the accepted voice input (processing sq 13); and changing the priority of the selected response information stored in the storage portion based on the evaluation result (step S20).

With the program above, the user's reaction to the response processing is evaluated based on the manner of voice of the voice input, and the priority of the selected response information stored in storage portion 203 is changed based on the evaluation result. Changing the priority then increases the possibility that the response information that meets the user's preference is selected and can achieve smooth communication with the user.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of controlling a server provided to be able to communicate with an interactive device, the method comprising the steps of:
    referring to a storage portion storing a plurality of voice response messages about operation of the interactive device responsive to a user, each associated with a priority serving as an index when being selected;
    selecting one voice response message in accordance with the priorities of the plurality of voice response messages stored in the storage portion;
    instructing the interactive device to execute response processing based on the selected voice response message;
    receiving voice input for the response processing from the user;
    evaluating the user's reaction to the response processing based on a manner of voice of the accepted voice input;
    changing the priority of the selected voice response message stored in the storage portion based on an evaluation result; and
    instructing the interactive device to execute response processing for prompting a re-response from the user when voice input is not accepted from the user as a reply to the response processing.

2. The method according to claim 1, wherein the step of changing includes the step of increasing the priority when it is determined that the reaction is good as an evaluation result, and decreasing the priority when it is determined that the reaction is bad.

3. The method according to claim 1, further comprising the step of:
    carrying out voice recognition of the received voice input.

* * * * *